Feb. 11, 1958  S. A. PROCTER  2,823,347
HIGH-VOLTAGE POWER SUPPLY
Filed Oct. 13, 1953
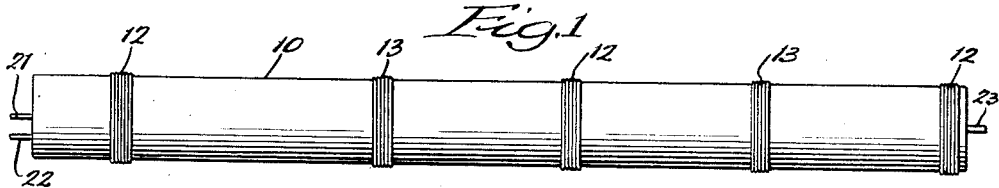
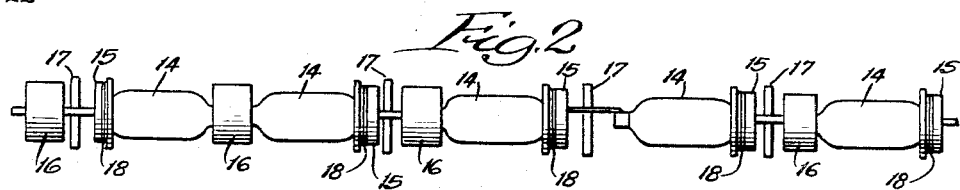
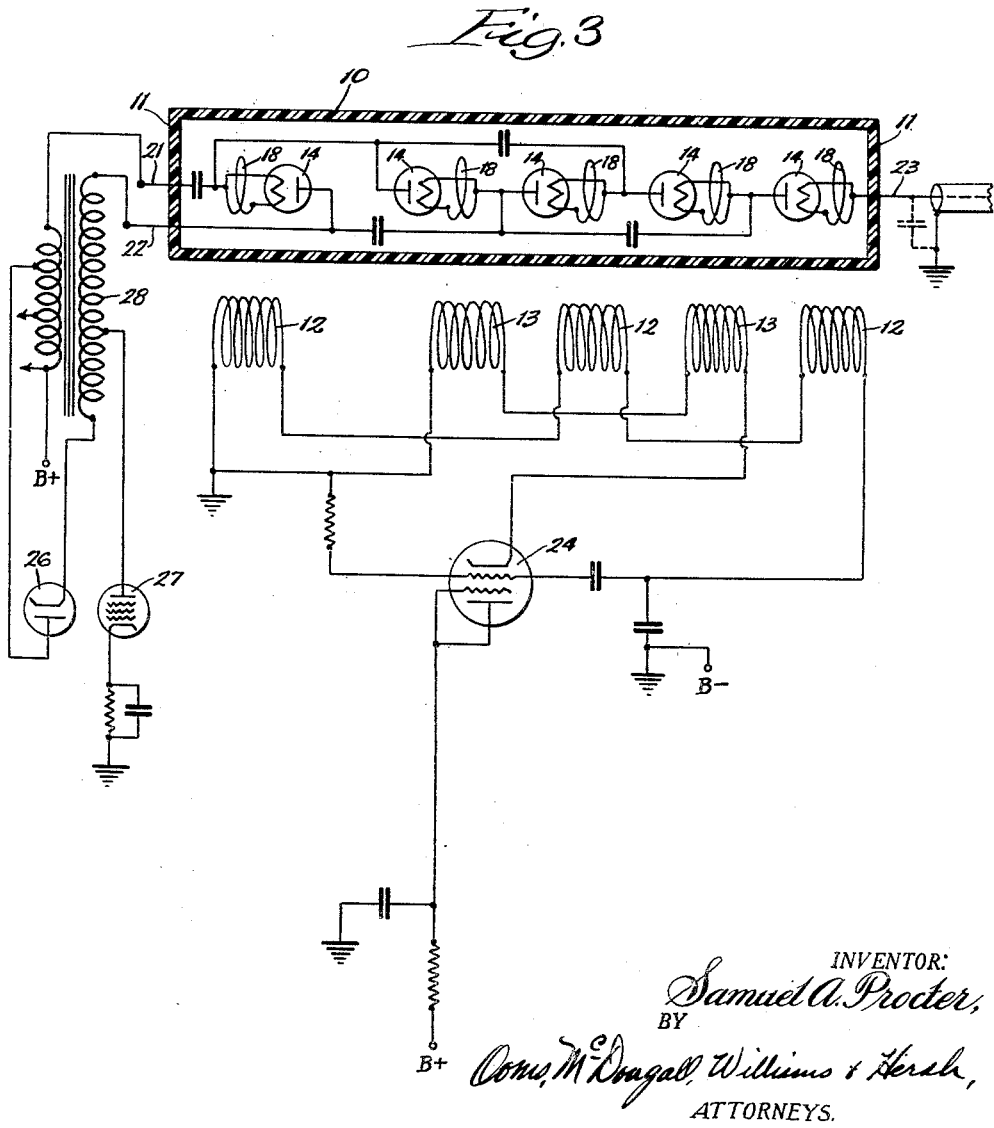
INVENTOR:
Samuel A. Procter,
BY
Osler, McDougall, Williams & Hersh,
ATTORNEYS.

United States Patent Office 2,823,347
Patented Feb. 11, 1958

2,823,347

HIGH-VOLTAGE POWER SUPPLY

Samuel A. Procter, Chicago, Ill.

Application October 13, 1953, Serial No. 385,733

5 Claims. (Cl. 321—15)

This invention relates to high-voltage power supplies; in particular, it relates to a high-voltage, low-current power supply particularly adapted for developing very high D.-C. potential for use on the accelerating anodes of cathode-ray tubes, as in television, radar, and laboratory oscilloscopes.

In the present specification, I have illustrated and described my invention in an embodiment wherein it is incorporated in a television receiver; however, it will be readily understood by persons in the art, upon studying the present specification, that my invention has extensive applications other than in television and may, in fact, be used in any application wherein it is desired to obtain a very high voltage, at relatively low current, from an alternating current source.

For a number of years, high-voltage power supplies have been employed in which a plurality of storage capacitors were used in conjunction with diode rectifiers in voltage-multiplying circuits. Circuits of that type have long been known by which indefinite multiplication of voltage could theoretically be achieved. As a practical matter, however, the voltages economically achievable have been quite limited. The main limiting factor has been the problem of insulation. The filaments of the various rectifier tubes in a voltage-multiplying circuit are, generally speaking, at high D.-C. potentials relative to ground. As a result, the filament-current sources used must be well insulated, and, in particular, the current source for the filament of the final rectifier tube in such a circuit must be insulated from ground sufficiently to withstand the peak D.-C. voltage developed by the power supply.

Other types of insulation difficulties have also presented themselves. Where a peak output voltage of, for example, 30,000 volts is required, a very real problem of circuit insulation exists, since such potentials are capable of jumping rather lengthy gaps, especially if the air be even slightly damp.

In the present invention, I have provided a simple and inexpensive means of obtaining a D.-C. voltage of practically any desired magnitude, with adequate insulation throughout. In particular, I have overcome in a novel and inexpensive manner the insulation problems just discussed.

It is, accordingly, the major object of the present invention to provide a high-voltage power supply wherein a plurality of thermionic diodes are operated with their filaments at potentials far above ground without requiring expensive insulation expedients.

Another object of the present invention is to provide a high-voltage power supply, all the components of which are securely housed within a sealed chamber of plastic or other suitable material, and wherein the problems of circuit insulation may be eliminated by immersing all the high-voltage components in an inert atmosphere.

Other objects and advantages of my invention will appear from the detailed description thereof which follows.

In the appended drawing, I have shown a specific embodiment of my invention adapted particularly to be incorporated in a television receiver as a voltage source for the picture tube. In the drawing, Fig. 1 shows in side elevation the external appearance of my power supply. Fig. 2 is a side elevation view of the high-voltage components of my power supply as they appear upon being removed from the housing shown in Fig. 1. Fig. 3 is a schematic view showing the electrical wiring of a typical embodiment of my invention as designed for producing a D.-C. output voltage approximately triple the peak value of the applied pulse voltage. (It will be understood that the voltage-tripling circuit in the present specification is merely exemplary; persons skilled in the art will readily understand how the circuit can be modified to provide any desired degree of multiplication.)

Referring now to the drawing, I show in Fig. 1 my power supply encased within a cylindrical housing 10, which may be made of polystyrene, or other suitable plastic material. In addition, glass may be used, if desired. My power supply is housed within the cylinder 10, and the ends of the cylinder are sealed off by suitable end plates 11, cemented or otherwise secured to the cylinder 10 so as to provide a completely enclosed housing. In embodiments of my invention wherein the voltages encountered are very large, I prefer that the housing 10 be gas-tight and that the air normally therein be replaced by a suitable inert atmosphere, such as nitrogen. When that technique is employed, the nitrogen pressure can be made greater than normal atmospheric pressure, whereupon, upon being sealed, the housing 10 will retain its inert atmosphere almost indefinitely.

If desired, the housing 10 or one of the end plates 11 may be provided with a suitable gas valve.

In applications wherein the peak voltage does not exceed 15,000 to 20,00 volts, it is usually practicable merely to close off the housing 10 by end plates 11 without supplying a special inert atmosphere for the interior of the housing. As will be explained hereinafter, my invention contains excellent inherent insulation properties, since the maximum potential drop takes place only across the full length of housing 10.

At spaced intervals along the outer surface of casing 10, I have provided a plurality of small coils 12 and 13. In a typical embodiment, these coils may be close-wound and consist of perhaps six turns each. The coils 12 are wired in series, and the coils 13 are likewise wired in series. As will be explained in a subsequent paragraph hereof, the coils 12 comprise the grid coil of a Hartley oscillator, while the coils 13 collectively comprise the cathode coil thereof.

In Fig. 2, I have shown the physical arrangement of the various high-voltage components which are enclosed within housing 10. In the example shown, they comprise five diode rectifier tubes 14, which may be of the type 1B3, with their respective sockets 15, together with a plurality of storage capacitors 16, which may be of the conventional tubular type which are in general use as high-voltage fixed capacitors in television receivers.

I have not in Fig. 2 attempted to bring out the wiring details of the apparatus, since that has been shown schematically in Fig. 3. Fig. 2 is simply a semi-diagrammatic showing of the manner in which the various parts of my power supply may be mounted within the housing 10. I employ between the various "decks" of my voltage-multiplier apparatus loosely-fitting plastic baffles 17, to provide mechanical support for the terminals of the storage capacitors and to maintain proper spacing of connecting leads.

Each of the tube sockets 15 has a coil 18 wound around it, the respective terminals of each coil 18 being connected to the filament terminals of the tube socket with which it is associated. In a typical case, each of the coils 18 may have four turns. As may be seen by comparing Figs. 1 and 2, the coils 12 and 13 are disposed on the outer surface of housing 10 in the manner such that one of the coils 12 or 13 directly overlies each of the coils 18.

The wiring of a typical embodiment of my invention is shown in Fig. 3. The housing 10 is indicated therein, and all the parts contained within the housing are schematically shown therewithin in Fig. 3. The A.-C. input to the power supply may enter the housing 10 via suitable sealed leads 21 and 22 in end plate 11 at one end of the housing 10. The high-voltage D.-C. output lead 23 may be suitably sealed in the opposite end plate wall 11.

No extended discussion of the circuit of the apparatus within housing 10 is believed necessary, since it constitutes a conventional voltage-multiplying circuit using storage capacitors and diodes. The only significant aspect of that circuit, from the viewpoint of the present invention, is the manner in which the diodes 14 are provided with filament current. That is accomplished by radio-frequency induction. Each of the coils 12 and 13 is operative to transfer to its associated coil 18 sufficient energy by induction to set up a suitable circulating current in the filament of a rectifier tube 14. As a result, all five of the tubes 14 are provided with suitable filament current without necessity for any filament leads outside the sealed housing 10.

Radio-frequency energy for heating the filaments of the diodes 14 is provided in coils 12 and 13 by vacuum tube 24, which is interconnected with coils 12 and 13 to function as a Hartley oscillator. The circuit of the oscillator may be a conventional one, coils 12 being connected in series to form the grid coil and coils 13 being connected in series to form the cathode coil. In the embodiment shown, the tube used as oscillator tube 24 may be either a triode or a medium-powered tetrode, such as a 6V6. For oscilaltor operation, the screen grid of a tetrode tube may be connected to the plate, as shown in Fig. 3.

The tubes 26 and 27 and the transformer 28 shown in Fig. 3 are conventional parts of a television receiver, tube 26 being the damper diode, tube 27 being the final horizontal sweep amplifier, and transformer 28 being the horizontal deflection transformer. Transformer 28 is provided with a high-voltage winding designed to provide a high-voltage pulse output which may be applied to the input leads 21 and 22 of my power supply.

It will be understood that any other suitable source of alternating voltage may be used in conjunction with my invention. My invention is not limited to any particular A.-C. voltage source, but consists broadly of a voltage-multiplying apparatus housed within an elongated insulating housing and having means for supplying filament current to the various diode rectifiers comprising pickup coils within the insulated housing and driving coils carried externally of the housing and suitably excited with radio-frequency currents.

The practical advantages of my invention are great. The total heat dissipated in my power supply is negligibly small, even when it is being operated to provide an output voltage in excess of 50,000. Each of the diode rectifiers requires only about ¼ watt of energy for filament heating, that heat being dissipated through approximately 3½ inches of housing length. This low power requirement permits the use as a filament-current source of a relatively small oscillator tube, and eliminates ventilation as a problem. Whether sealed or not, my power supply can be mounted at any desired point within the cabinet of a television set or other electronic unit. In the specific case of a television receiver, the power supply may with propriety be mounted above the chassis with its high-voltage terminal immediately adjacent the high-voltage terminal of the picture tube. Moreover, the greater the voltage multiplication, the longer becomes the housing and the better insulated the high-voltage terminal. I have found that voltages up to 75,000 volts can readily be obtained from a conventional driving source such as a horizontal sweep transformer, without encountering the slightest difficulty with respect to insulation. The housing, if made of polyethylene, or similar plastic, will completely insulate the external driving coils 12 and 13 from the internal pick-up coils 18. It will be understood, of course, that the frequency of the current used to heat the filaments of rectifiers 14 is entirely a matter of design, and may take any value within extremely wide limits. Similarly, the constants of the various parts in the oscillator circuit comprising tube 24 are not critical and may be chosen in accordance with conventional design requirements for the tube used.

While I have, in the present specification, described at some length a particular embodiment of my invention, it is to be understood that that description is exemplary only. I desire that the scope of my invention be determined primarily by reference to the appended claims.

I claim:

1. A high-voltage power supply, comprising an enclosed insulating housing, a plurality of capacitors and rectifier tubes enclosed therewithin and connected in a voltage-multiplying circuit, said rectifier tubes having thermionic filaments, a pick-up coil carried within said housing for each of said filament-type rectifier tubes, each of said coils being connected across one of said filaments, a driving coil mounted externally of said housing inductively coupled to each of said pick-up coils, and oscillator means for driving radio-frequency current through said driving coils for inducing currents of like frequency in each of said pick-up coils.

2. Apparatus according to claim 1, wherein said housing is sealed gas-tight.

3. Apparatus according to claim 1, wherein said housing is sealed gas-tight and filled with an inert atmosphere at super-atmospheric pressure.

4. A high-voltage power supply comprising an elongated cylindrical housing formed of dielectric material and being closed at its respective ends to provide a substantially gas-tight enclosure, one of the ends of said housing being provided with a pair of electrical conductors passing therethrough, and the other end of said housing being provided with at least one electrical conductor passing therethrough, a voltage-multiplying rectifier mounted within the interior of said housing, said rectifier comprising a plurality of storage capacitors and rectifier tubes, said capacitors and tubes being stacked within said housing along the axis thereof, circuit means connecting said conductors at said first end of the housing to the input of said voltage-multiplying circuit, and other circuit means connecting the high-voltage output of said voltage-multiplying circuit to said conductor at said other end of the housing, said rectifier tubes comprising thermionic filaments and having associated with each a pick-up coil for each rectifier tube mounted adjacent said respective tube bases at spaced positions along the axis of said housing, said pick-up coils being bridged across the filament terminals of said respective tubes and being carried wholly within said housing, and a plurality of coils wound on the outside surface of said housing and spaced therealong so as to provide inductive coupling with each of said pick-up coils, said external coils being adapted for connection to a radio-frequency oscillator.

5. The apparatus of claim 4 wherein said housing is filled with an inert gas at super-atmospheric pressure.

References Cited in the file of this patent

UNITED STATES PATENTS

| 2,320,170 | Bishop et al. | May 25, 1943 |
| 2,499,484 | Friend | Mar. 7, 1950 |
| 2,568,485 | Cage | Sept. 18, 1951 |
| 2,586,018 | Friend | Feb. 19, 1952 |

FOREIGN PATENTS

| 486,065 | Great Britain | May 30, 1938 |